(12) United States Patent
Hanrahan et al.

(10) Patent No.: US 7,583,476 B2
(45) Date of Patent: Sep. 1, 2009

(54) TOLERANCE RING FOR DATA STORAGE WITH CUT-OUT FEATURE FOR MASS CONTROL

(75) Inventors: Kevin P. Hanrahan, Santa Barbara, CA (US); Ryan J. Schmidt, Santa Barbara, CA (US); David D. Dexter, Goleta, CA (US)

(73) Assignee: Intri-Plex Technologies, Inc., Santa Barbara, CA (US)

( * ) Notice: Subject to any disclaimer, the term of this patent is extended or adjusted under 35 U.S.C. 154(b) by 318 days.

(21) Appl. No.: 11/508,083

(22) Filed: Aug. 22, 2006

(65) Prior Publication Data
US 2008/0049362 A1 Feb. 28, 2008

(51) Int. Cl.
G11B 5/55 (2006.01)

(52) U.S. Cl. .................................................. 360/265.6

(58) Field of Classification Search .............. 360/265.6, 360/264.3, 265.2, 265.5; 403/365; 464/30; 114/244
See application file for complete search history.

(56) References Cited

U.S. PATENT DOCUMENTS

| | | | |
|---|---|---|---|
| 1,662,544 A | 3/1928 | Solenberger | |
| 2,325,616 A * | 7/1943 | Landweber | 114/244 |
| 2,628,113 A | 2/1953 | Jones | |
| 2,886,354 A | 5/1959 | Bjorklund | |
| 2,897,026 A | 7/1959 | Haller et al. | |
| 2,931,412 A | 4/1960 | Wing | |
| 2,950,937 A | 8/1960 | Bedford, Jr. | |
| 3,061,386 A | 10/1962 | Dix et al. | |
| 3,125,397 A | 3/1964 | McGrath | |
| 3,142,887 A | 8/1964 | Hulck et al. | |
| 3,145,547 A | 8/1964 | Lyons | |
| 3,156,281 A | 11/1964 | Demi | |
| 3,197,243 A | 7/1965 | Brenneke | |
| 3,233,497 A | 2/1966 | McCormick | |
| 3,396,554 A | 8/1968 | Westercamp | |
| 3,494,676 A | 2/1970 | Compton | |
| 3,672,708 A | 6/1972 | Zemberry | |
| 3,700,271 A | 10/1972 | Blaurock et al. | |
| 3,730,569 A | 5/1973 | Feinler | |
| 3,768,845 A | 10/1973 | Gilliland | |
| 3,838,928 A | 10/1974 | Blaurock et al. | |
| 3,861,815 A | 1/1975 | Landaeus | |
| 4,069,618 A | 1/1978 | Geiss | |
| 4,222,310 A | 9/1980 | Garrett et al. | |
| 4,286,894 A | 9/1981 | Rongley | |

(Continued)

FOREIGN PATENT DOCUMENTS

DE 916370 8/1954

(Continued)

OTHER PUBLICATIONS

US Tolerance Rings Catalog, WebSite, before 2000.*

(Continued)

*Primary Examiner*—Tianjie Chen

(57) ABSTRACT

A tolerance ring configured to improve mass eccentricity of an actuator arm assembly. The tolerance ring has a cylinder with a predetermined length between two ends, with a gap along the predetermined length of the cylinder, the gap having a first and a second edge, the cylinder having an aperture in the surface of the cylinder at the second edge.

16 Claims, 10 Drawing Sheets

U.S. PATENT DOCUMENTS

| | | | |
|---|---|---|---|
| 4,790,683 A | 12/1988 | Cramer, Jr. et al. | |
| 4,828,423 A | 5/1989 | Cramer, Jr. et al. | |
| 4,981,390 A | 1/1991 | Cramer, Jr. et al. | |
| 5,125,755 A | 6/1992 | Adler et al. | |
| 5,575,691 A | 11/1996 | Matthews | |
| 5,613,265 A | 3/1997 | Gemmell | |
| 5,647,766 A | 7/1997 | Nguyen | |
| 5,867,348 A | 2/1999 | Suwa | |
| 6,163,441 A | 12/2000 | Wood et al. | |
| 6,288,878 B1 | 9/2001 | Misso et al. | |
| 6,288,879 B1 | 9/2001 | Misso et al. | |
| 6,333,839 B1 | 12/2001 | Misso et al. | |
| 6,411,472 B1 | 6/2002 | Allsup | |
| 6,480,363 B1 | 11/2002 | Prater | |
| 6,525,910 B1 | 2/2003 | Macpherson et al. | |
| 6,527,449 B1 | 3/2003 | Koyama et al. | |
| 6,603,636 B2 | 8/2003 | Schwandt et al. | |
| 6,606,224 B2 | 8/2003 | Macpherson et al. | |
| 6,889,956 B2 | 5/2005 | Gutierrez et al. | |
| 7,085,108 B1 | 8/2006 | Oveyssi et al. | |
| 2002/0024770 A1 | 2/2002 | Hong et al. | |
| 2003/0053260 A1* | 3/2003 | Barina et al. | 360/265.6 |
| 2003/0156357 A1 | 8/2003 | Brink et al. | |
| 2004/0145830 A1 | 7/2004 | Brink et al. | |
| 2004/0238944 A1 | 12/2004 | Bish et al. | |
| 2005/0225903 A1* | 10/2005 | Sprankle et al. | 360/264.3 |
| 2006/0181811 A1* | 8/2006 | Hanrahan et al. | 360/265.2 |
| 2006/0275076 A1* | 12/2006 | Hanrahan et al. | 403/365 |
| 2006/0276246 A1* | 12/2006 | Needes et al. | 464/30 |
| 2008/0043374 A1* | 2/2008 | Hanrahan et al. | 360/265.6 |
| 2008/0043375 A1* | 2/2008 | Hanrahan et al. | 360/265.6 |

FOREIGN PATENT DOCUMENTS

| | | |
|---|---|---|
| DE | 1 855 948 | 8/1962 |
| DE | 29 50 985 | 12/1979 |
| EP | 1 067 336 | 1/2001 |
| FR | 2 627 620 | 12/1988 |
| GB | 1094610 | 6/1965 |
| GB | 1297599 | 4/1971 |
| GB | 1386738 | 2/1973 |
| GB | 2382386 | 5/2003 |
| GB | 2413594 | 11/2005 |
| GB | 2413608 | 11/2005 |
| JP | 2003-518592 | 6/2003 |
| JP | 2003-522912 | 7/2003 |
| JP | 2005-114025 | 4/2005 |
| WO | WO 01/41136 | 6/2001 |
| WO | WO 03/25907 | 3/2003 |
| WO | WO 03/036766 | 5/2003 |
| WO | WO 2005/106268 | 11/2005 |
| WO | WO 2006/056731 | 6/2006 |

OTHER PUBLICATIONS

PCT International Search Report and the Written Opinion of the International Searching Authority dated Dec. 19, 2008 for International Application No. PCT/US2007/076239 filed Aug. 17, 2007.

* cited by examiner

TOLERANCE RING FOR DATA STORAGE WITH CUT-OUT FEATURE FOR MASS CONTROL

BACKGROUND OF THE INVENTION

1. Field of the Invention

This invention relates generally to bearing tolerance rings. More particularly, the invention pertains to tolerance rings used in cartridge bearings for actuator arms in information storage devices, such as hard disk drives.

2. Description of Related Art

A key component of any computer system is a device to store data. One common place for storing massive amounts of data in a computer system is on a disc drive. The most basic parts of a disc drive are a disc that is rotated, an actuator that moves a transducer to various locations on the disc, and electrical circuitry that is used to write and read data to and from the disc. Coupled to the actuator is a head-gimbal assembly (HGA) that includes a head and metal suspension. The HGA's can be stacked together into a head-stack assembly (HSA), which is propelled across the disk surface by the actuator. There are a variety of disc drives in use today, such as hard disc drives, zip drives, floppy disc drives. All utilize either rotary or linear actuators.

In hard disk drives, magnetic heads read and write data on the surfaces of rotating disks that are co-axially mounted on a spindle motor. The magnetically-written "bits" of information are laid out in concentric circular "tracks" on the surfaces of the disks. The disks must rotate quickly so that the computer user does not have to wait long for a desired bit of information on the disk surface to become positioned under the head. In modern disk drives, data bits and tracks must be extremely narrow and closely spaced to achieve a high density of information per unit area of the disk surface.

The required small size and close spacing of information bits on the disk surface have consequences on the design of the disk drive device and its mechanical components. Among the most important consequences is that the magnetic transducer on the head must operate in extremely close proximity to the magnetic surface of the disk. Because there is relative motion between the disk surface and the magnetic head due to the disk rotation and head actuation, continuous contact between the head and disk can lead to tribological failure of the interface. Such tribological failure, known colloquially as a "head crash," can damage the disk and head, and usually cause data loss. Therefore, the magnetic head is designed to be hydrodynamically supported by an extremely thin air bearing so that its magnetic transducer can operate in close proximity to the disk while physical contact between the head and the disk is minimized or avoided. Typically, the head-to-disk spacing present during operation of modern hard disk drives is extremely small, measuring in the tens of nanometers.

Characteristics of the actuator used for moving the magnetic transducer in close proximity to the disk must be considered by the designer to minimize vibration in response to rapid angular motions and other excitations. For example, the actuator arm must be stiff enough and the actuator pivot bearing must be of high enough quality so that the position of the head can be precisely controlled during operation. Also, the interface between the actuator arm and the pivot bearing must be of sufficient rigidity and strength to enable precise control of the head position during operation and to provide the boundary conditions necessary to facilitate higher natural resonant frequencies of vibration of the actuator arm. Typically, the actuator arm is fabricated from aluminum or an alloy of aluminum and is therefore softer and more easily scratched than the pivot bearing sleeve, which is typically fabricated from stainless steel.

The stiffness of the actuator must also be sufficient to limit deflection that might cause contact with the disk during mechanical shock events. Likewise, the interface between the actuator structure and the pivot bearing must be of sufficient strength to prevent catastrophic structural failure such as axial slippage between the actuator arm and the actuator pivot bearing sleeve during large mechanical shock events.

In many disc drives, the actuator arm or arms are fixed to the actuator pivot bearing by a tolerance ring. Typically, tolerance rings include an open cylindrical base portion and a plurality of contacting portions that are raised or recessed from the cylindrical base portion. The contacting portions are typically partially compressed during installation to create a radial preload between the mating cylindrical features of the parts joined by the tolerance ring. The radial preload compression provides frictional engagement that prevents actual slippage of the mating parts. For example, in disc drive applications, the radial compressive preload of the tolerance ring prevents separation and slippage at the interface between the actuator arm and the pivot bearing during operation and during mechanical shock events. The tolerance ring also acts as a radial spring. In this way, the tolerance ring positions the interior cylindrical part relative to the exterior cylindrical part while making up for radii clearance and manufacturing variations in the radius of the parts.

Additional features have been added to tolerance rings to obtain specific advantages. For example, in U.S. Pat. No. 6,288,878 to Misso et al., circumferential brace portions have been added to the tolerance ring to increase hoop strength. U.S. Pat. No. 6,338,839 to Misso et al. discloses a tolerance ring which provides a low consistent installation force profile.

U.S. Pat. No. 4,790,683 to Cramer, Jr. et al. discloses the use of a conventional tolerance ring in conjunction with a cylindrical shim in applications characterized by structurally significant radial vibration or loading. The shim prevents deformation of the soft underlying material and thereby prevents undesirable partial relief of the radial compression that maintains frictional engagement of the tolerance ring.

State of the art tolerance rings are typically manufactured from a flat metal sheet with stamping, forming, rolling, and other steps to provide ways to recess contacting portions and a final generally cylindrical shape. Because of the way tolerance rings are manufactured, they typically have a gap or spacing formed where the opposite edges of the rolled metal sheet meet. A perspective view of a prior art tolerance ring is illustrated in FIG. 1.

The tolerance ring can be installed first into a cylindrical hole in an exterior part, such as an actuator arm, so that later a cylindrical inner part, such as an actuator pivot bearing, can be forcibly pushed into the interior of the tolerance ring to create a radial compressive preload that retains the parts by frictional engagement. In this case, the contacting portions may be recessed to a lesser radius than the base portion as well as raised to a greater radius than the base portion. Alternatively, a tolerance ring can be installed first around a cylindrical inner part, such an actuator pivot bearing. The inner part, together with the tolerance ring, is then forcibly pushed into the interior of the cylindrical hole in an exterior part, such as an actuator arm, to create a radial compressive preload that retains the parts by frictional engagement. In this case, the contacting portions of the tolerance ring are typically raised to a greater radius than the base portion.

The stiffness and mass characteristics of a tolerance ring can influence the HSA bandwidth. For example, the gap or spacing between the ends in prior art tolerance rings can cause mass eccentricity thereby affecting the dynamic balance of the actuator. Most disc drive makers live with this problem and tolerance ring manufacturers try to minimize the gap by allowing for as small a gap as possible while avoiding the possibility of the two ends of the tolerance ring from touching, after assembly.

To compensate for mass imbalance, disk drive makers are forced to either manually align the gap in a direction known by trial and error to reduce mass imbalance (also referred to as clocking) or counteracting overall eccentric mass which reduces performance. Clocking does not remove the mass imbalance, but rather makes it known and thus possible to compensate for in other ways, for instance, by balancing nearby parts such as actuator arm or fan tail. Furthermore, minimizing the gap helps reduce mass imbalance but the tolerance ring ends are still rather long due to manufacturing constraints. Consequently, the space between the bumps juxtapose the gap is larger than the space between the bumps elsewhere.

With an increasing demand for improved consistency in installing the actuator arm in a hard disk, there remains a continuing need in the art for a tolerance ring that reduces mass imbalance and mass eccentricity.

SUMMARY OF THE INVENTION

A tolerance ring configured to improve mass eccentricity of an actuator arm assembly. The tolerance ring has a cylinder with a predetermined length between two ends, with a gap along the predetermined length of the cylinder, the gap having a first and a second edge, the cylinder having an aperture in the surface of the cylinder at the second edge. In one embodiment, the tolerance ring has a first tab protruding from the first edge of the gap and coupling to the cylinder at the second edge of the gap. Combining the aperture with tabs allows maximum flexibility in reducing mass eccentricity. The first tab is engageable with the aperture in the surface of the cylinder. The first tab configuration may be L-shaped or U-shaped. The aperture may be placed as required, enclosing along an edge of the gap to reduce mass imbalance and improve mass eccentricity of the tolerance ring. In another embodiment, the tolerance ring has a second tab protruding from the second edge of the gap, the second tab coupling to the first tab on the first edge. The first and second tabs are adapted to hook together and close the gap.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the Figures thereof and wherein.

DETAILED DESCRIPTION OF THE PREFERRED EMBODIMENTS

Figure 1:
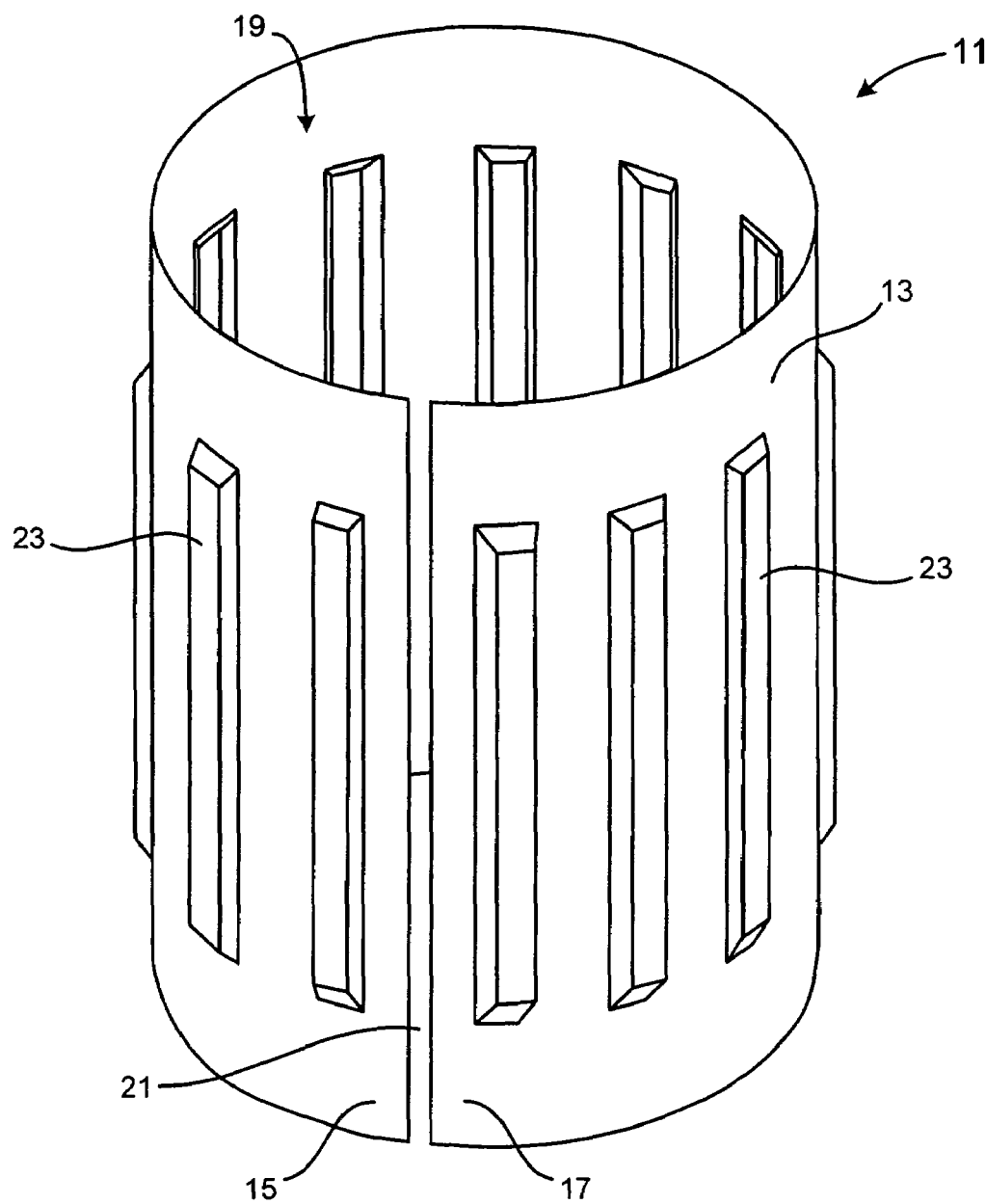
FIG. 1 is a perspective view of a prior art tolerance ring design.

FIG. 1 illustrates a perspective view of a prior art tolerance ring design 11. In one embodiment, the tolerance ring 11 is made from 300 Series stainless steel. The tolerance ring 11 is formed from a substantially planar base portion that is curved to form a cylinder 13. The cylinder 13 has a first radius about a central axis and extends for a fixed length parallel to the central axis. Radial expansion and contraction of cylindrical opening 19 is facilitated by a gap 21 along the length of tolerance ring 11, the gap 21 having a first edge 15 and a second edge 17.

The tolerance ring 11 has a plurality of contacting portions 23. The contacting portions 23 generally have a rhomboidal cross-sectional shape extending axially along the cylinder 13. As shown in FIG. 1, the contacting portions 23 project radially outward in a direction away from the interior of the tolerance ring 11. It is recognized that alternative configurations known in the art include tolerance rings with contacting portions 23 that project radially inward or project inward and outward in an alternating fashion.

Figure 2:
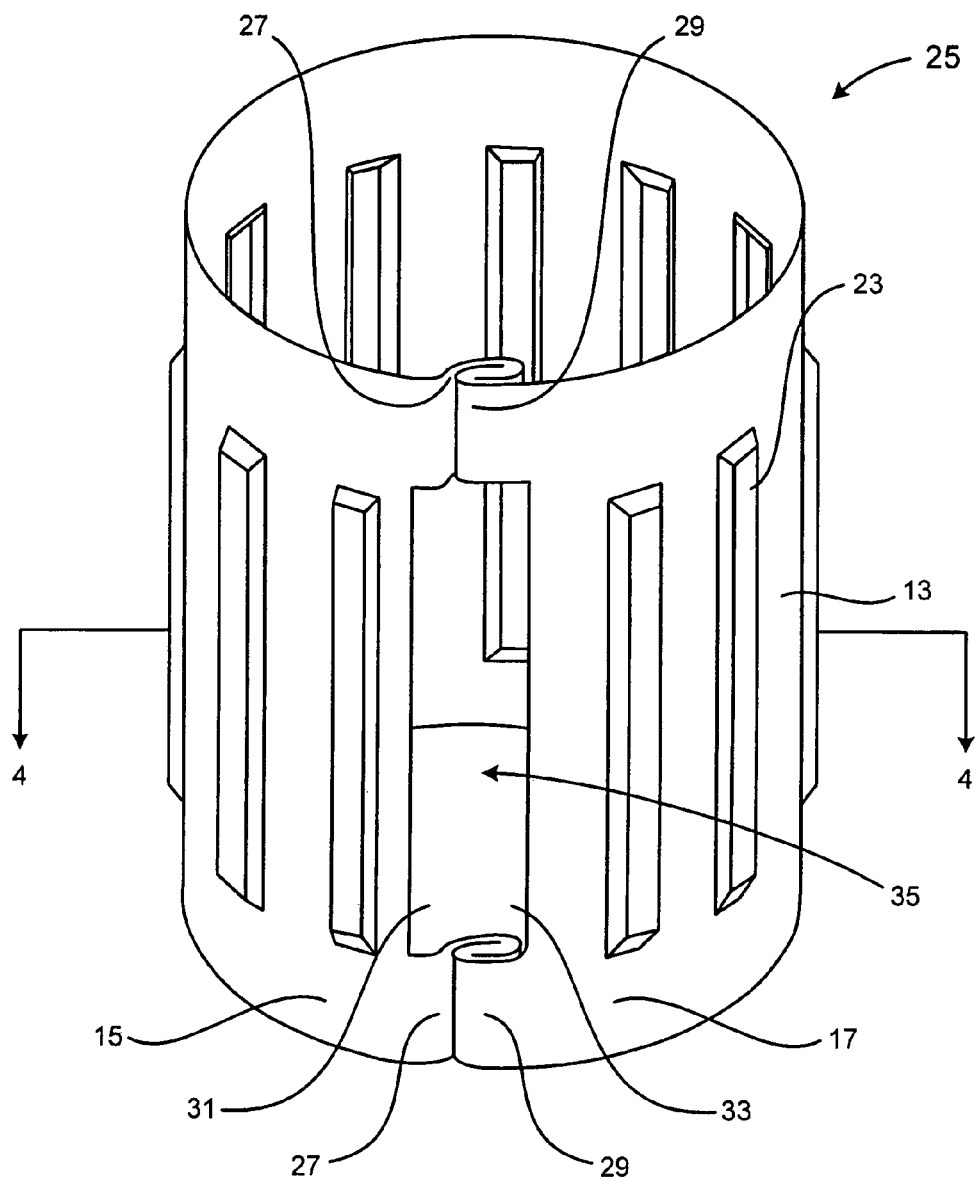
FIG. 2 is a perspective view of a tolerance ring with according to one embodiment of the present invention.

FIG. 2 is a perspective view of a tolerance ring 25 with hook-shaped tabs and a cut-out feature for mass control according to one embodiment of the present invention. The tolerance ring 25 has hook-shaped tabs 27 and 29 with opposite mating ends. These ends engage one another to close the linear gap 21 (FIG. 1) formed between the tabs 27 and 29. Edges 15 and 17 have cut-outs 31 and 33, respectively, to balance the increase in mass from the hook-shaped tabs 27 and 29. When the hook-shaped tabs 27 and 29 engage one another, cut-outs 31 and 33 are proximately aligned with one another to form a cavity 35 in the tolerance ring 25. The hook-shaped tabs and cut-out features of the tolerance ring 25 improve mass eccentricity and reduce mass imbalance of the actuator arm assembly.

Figure 3:
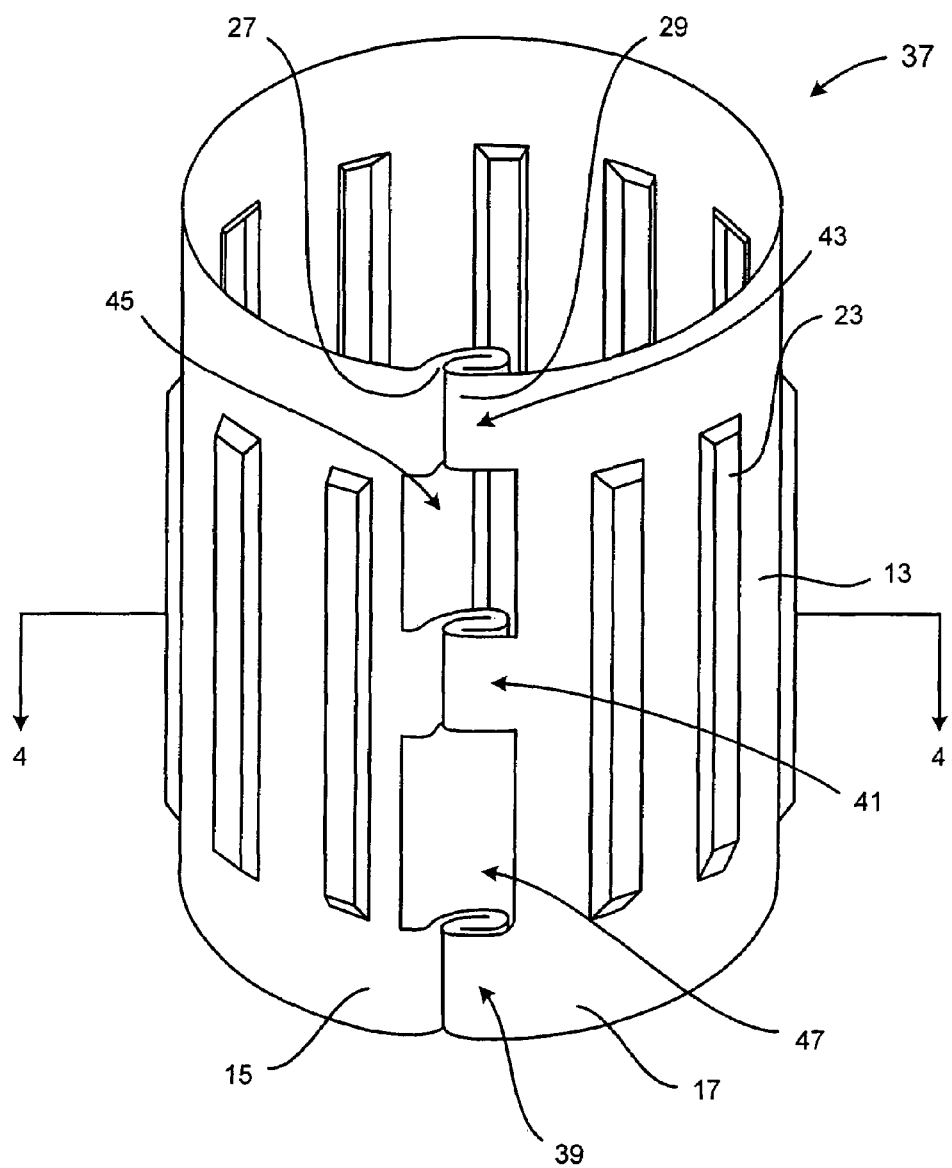
FIG. 3 is a perspective view of a tolerance ring according to another embodiment of the present invention.

FIG. 3 is a perspective view of a tolerance ring 37 with three hook-shaped tabs and cut-out feature. The tolerance ring 37 has hook-shaped tabs, generally indicated 39, 41 and 43, with opposite mating ends on the first and second edges 15 and 17, respectively. To balance an increase in mass on one end of the tolerance ring 37 resulting from the hook-shaped tabs 39, 41 and 43, cut-outs are made in edges 15 and 17, generally shown as cavities 47 and 45. The hook-shaped tabs and cut-outs of the tolerance ring 37 improve mass eccentricity and reduce mass imbalance of the actuator arm assembly.

Figure 4:
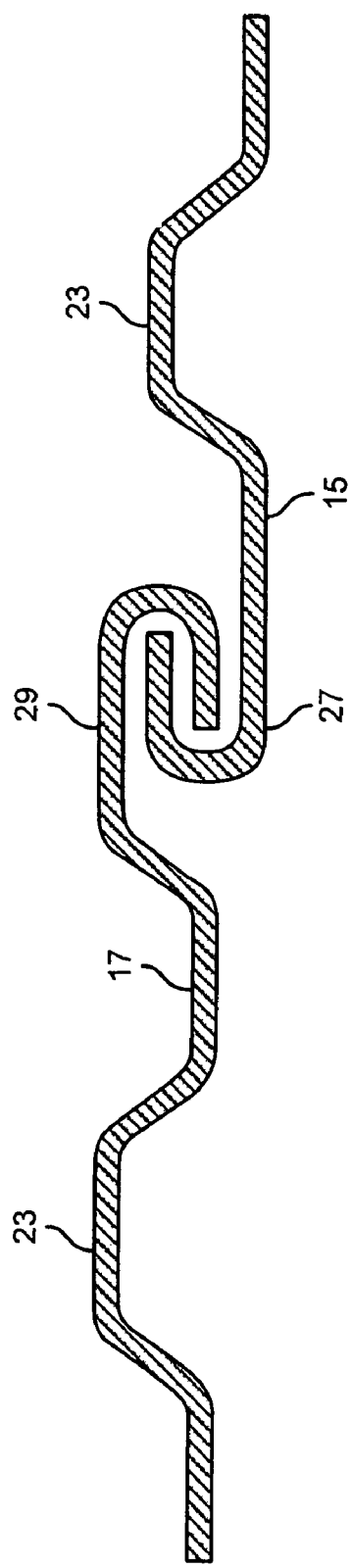
FIG. 4 is a cross-sectional view of the tolerance ring along line 4-4 of FIGS. 2 or 3.

FIG. 4 is a cross-sectional view of the tolerance ring along line 4-4 of FIGS. 2 or 3, illustrating a cut-out feature in accordance to one embodiment of the present invention. The hook-shaped tabs 27 and 29 engage one another to close the gap 21 (FIG. 1) formed between the first tab 15 and the second tab 17. Typically, the gap 21 allows tolerance rings to readily interlock during shipping and handling. Separating interlocked tolerance rings is time consuming, expensive and may subject the tolerance rings to handling damage. Hence, by eliminating this gap 21, the tolerance ring 25 or 37 has an additional advantage of not tangling or interlocking with other tolerance rings 25 or 37 during shipping and handling.

Figure 5:
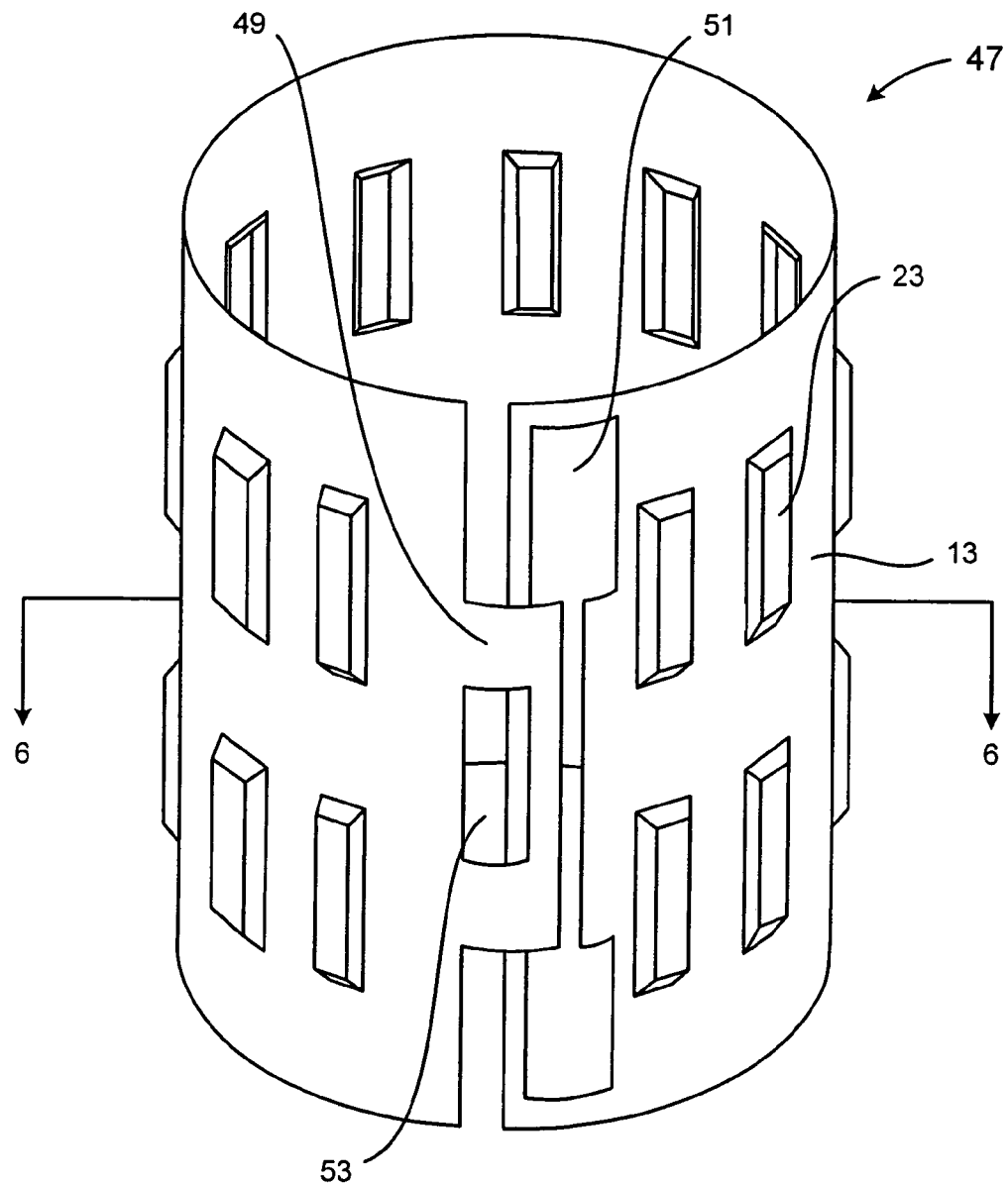
FIG. 5 is a perspective view of a tolerance ring according to yet another embodiment of the present invention.

FIG. 5 is a perspective view of a tolerance ring 47 according to another embodiment of the present invention. The aperture 51 is a cavity formed in the cylinder 13 that is at least large enough to receive the tab 49 on the opposite end. This tab 49 and aperture 51 feature of the tolerance ring 47 improves mass eccentricity and reduces mass imbalance of the actuator arm assembly. Tab 49 has a cavity or opening 53 to account for mass increase on one side of the tolerance ring 47 by the additional material of the tab 49. It can be envisioned that the tab 49 can have any configuration that is receivable by a mating aperture 520 on the opposite end.

FIG. 5 also illustrates an alternate configuration for contacting portions 23. Contacting portions 23 are arranged in a plurality of rows along the surface of the planar base portion 13.

Figure 6:
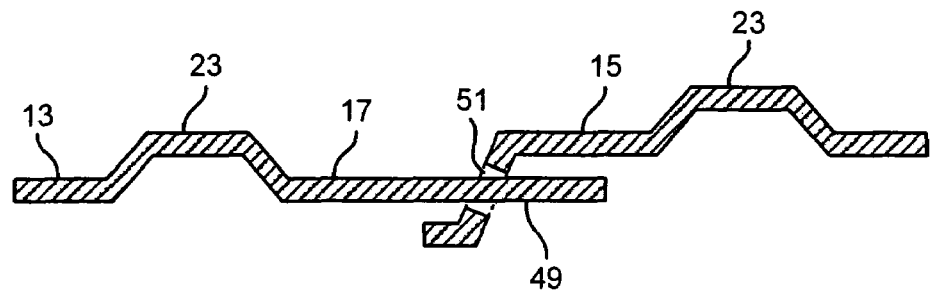
FIG. 6 illustrates a cross-sectional view of the tolerance ring along line 6-6 of FIG. 5.
Figure 7:
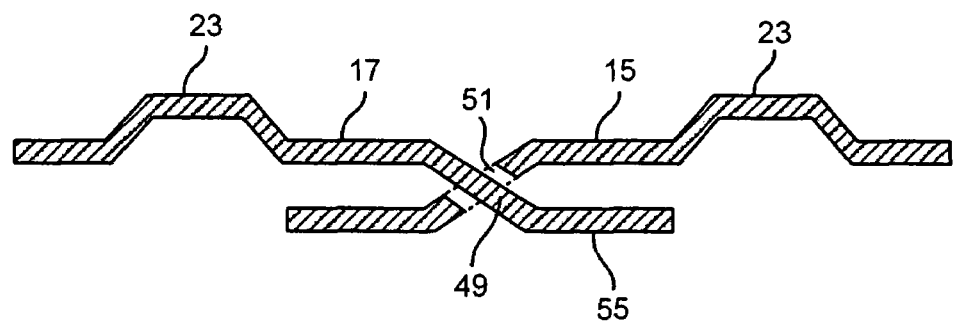
FIG. 7 illustrates another cross-sectional view of the tolerance ring along line 6-6 of FIG. 5.

FIGS. 6 and 7 illustrate alternate cross-sectional views of the tolerance ring 47 along line 6-6 of FIG. 5. The tab 49 is removably engageable with the aperture 51. FIG. 6 shows a tab 49 configuration that is tangential to the cylinder 13. FIG. 7 illustrates an alternate tab 49 configuration with a flange 55 to securely couple edges 15 and 17. By eliminating the gap 21, tolerance ring 47 has an additional advantage of not tangling or interlocking with other tolerance rings 47 during shipping and handling.

It is recognized that alternative tab and aperture configurations can be used while improving mass eccentricity and reducing mass imbalance of the actuator arm assembly. For example, the tolerance ring 47 can have a plurality of tabs that mate with a plurality of apertures.

Figure 8:
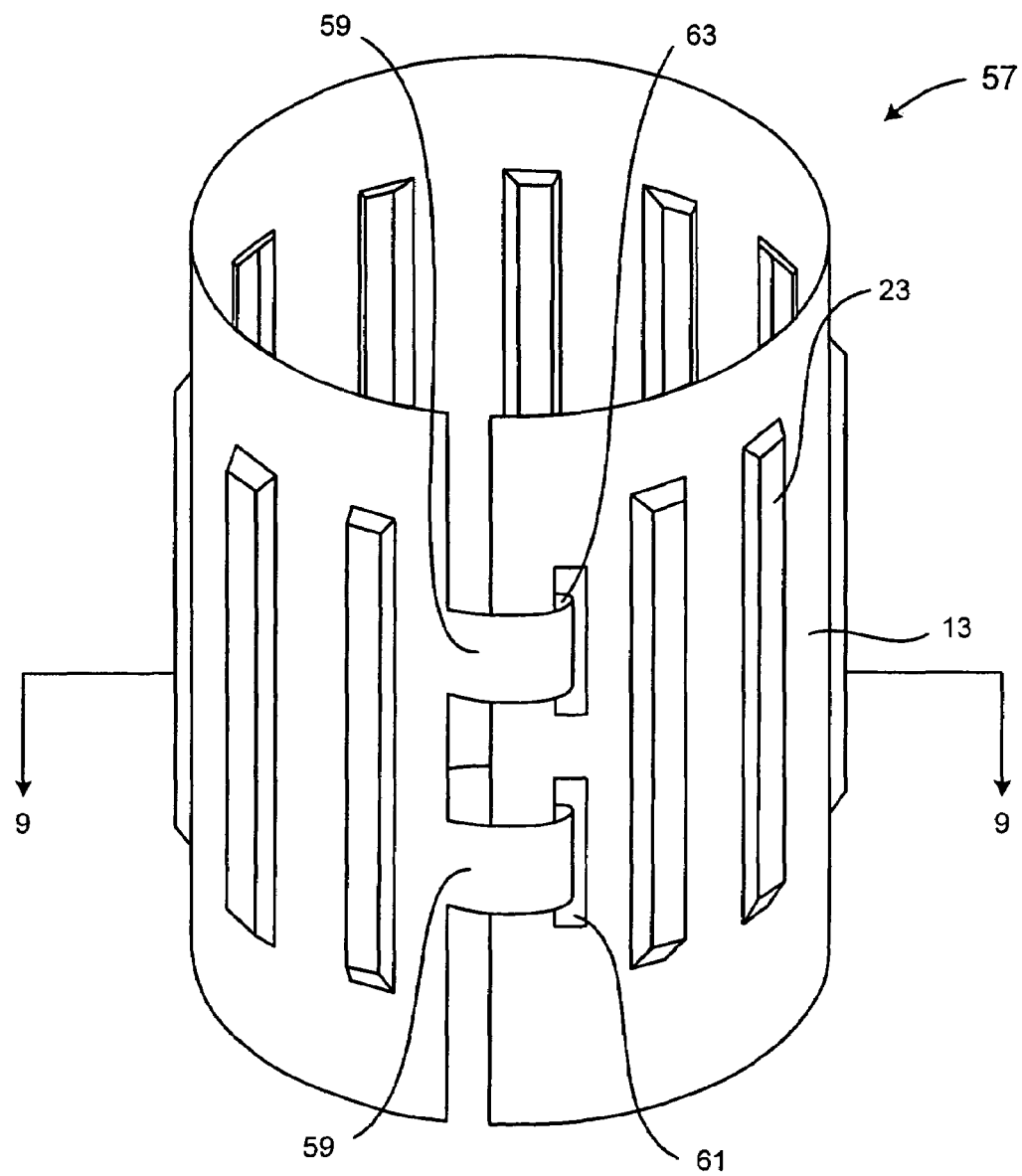
FIG. 8 is a perspective view of a tolerance ring according to a further another embodiment of the present invention.
Figure 9:
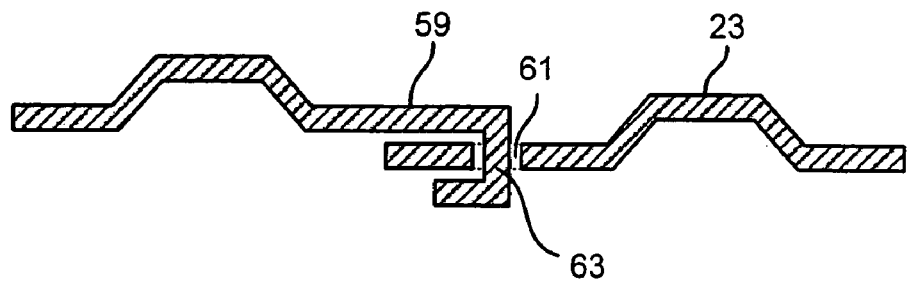
FIG. 9 illustrates a cross-sectional view of the tolerance ring along line 9-9 of FIG. 8.
Figure 10:
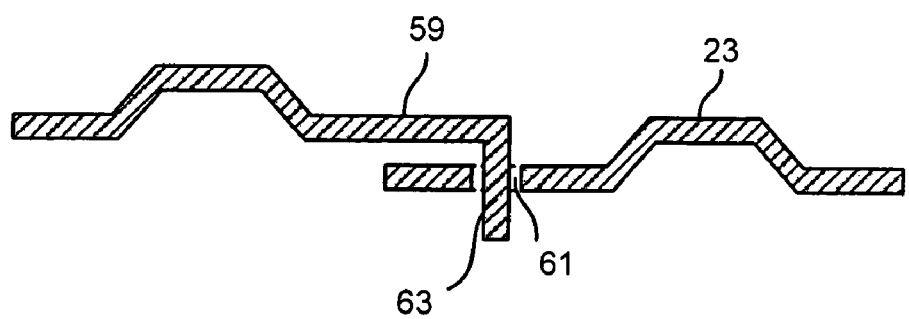
FIG. 10 illustrates another cross-sectional view of the tolerance ring along line 9-9 of FIG. 8.

FIG. 8 shows a perspective view of a tolerance ring 57 with two tabs 59 that are removably engageable with two apertures 61. The tabs 59 mate with apertures 61 in the same manner as explained in FIGS. 6 and 7. The tabs 59 clip or hook onto the edge of apertures 61, as shown in FIGS. 9 and 10. The tabs 59 can have an L-shaped or U-shaped flange 63 that hook on the edge of apertures 61 in the surface of the cylinder 13. By eliminating the gap 21, the mass eccentricity of the ring is improved with the additional advantage of producing a ring that does not tangle or interlock with other tolerance rings 47 during shipping and handling.

Figure 11:
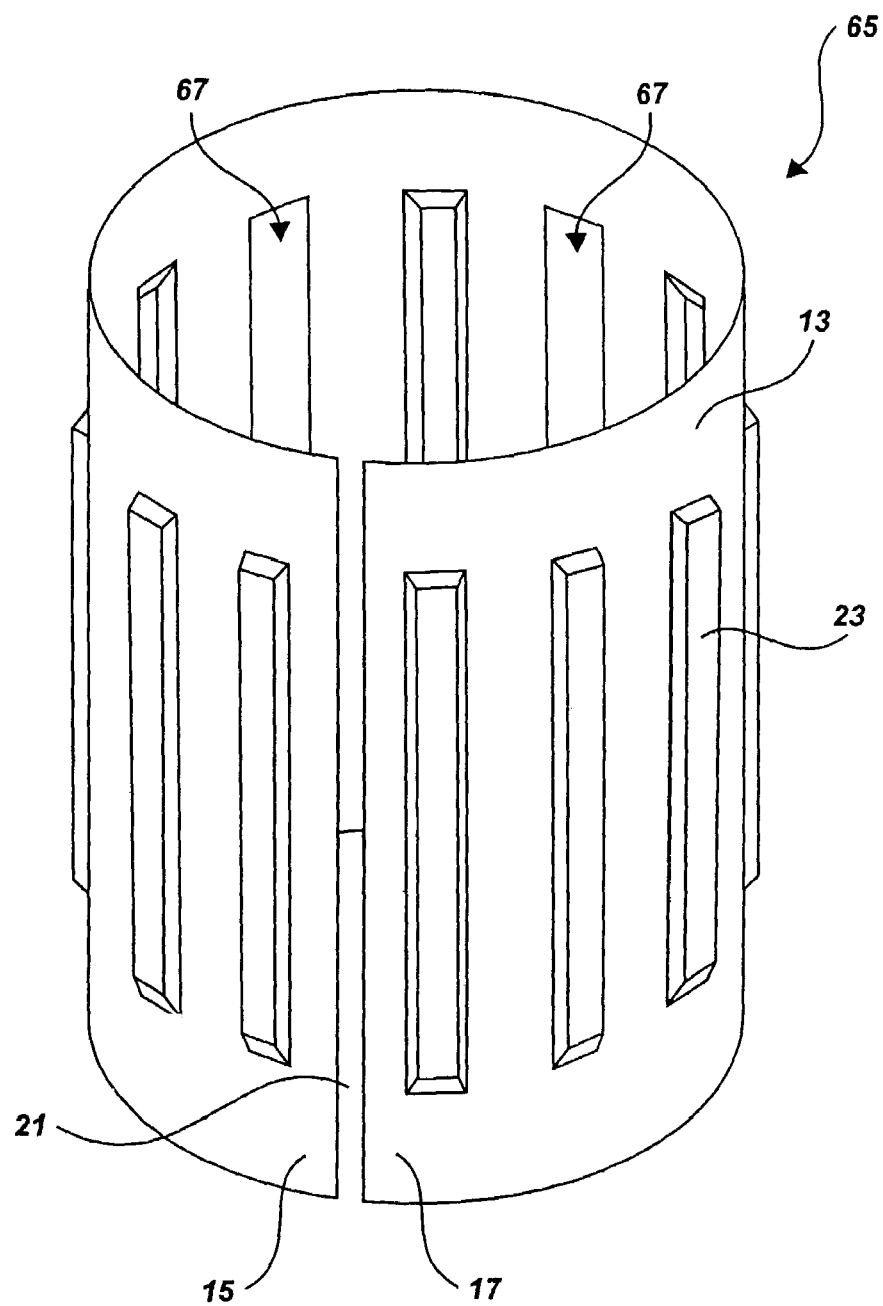
FIG. 11 is a perspective view of a tolerance ring according to another embodiment of the present invention.

FIG. 11 is a perspective view of a tolerance ring 65 with cut-out feature for mass eccentricity control of the base portion. The tolerance ring 65 can have one or more cut-outs or apertures, generally shown as 67, along the cylinder 13. The number and size of the apertures 67 is a function of mass distribution. The function of the apertures 67 is to provide a substantially balanced and non-eccentric tolerance ring 65. It can be envisioned that the apertures 67 can have different shapes, such as, but not limited to, circle, square, triangle, polygon, or rectangle. Similarly, the apertures 67 can be distributed over one or more rows along the cylinder 13.

Figure 12:
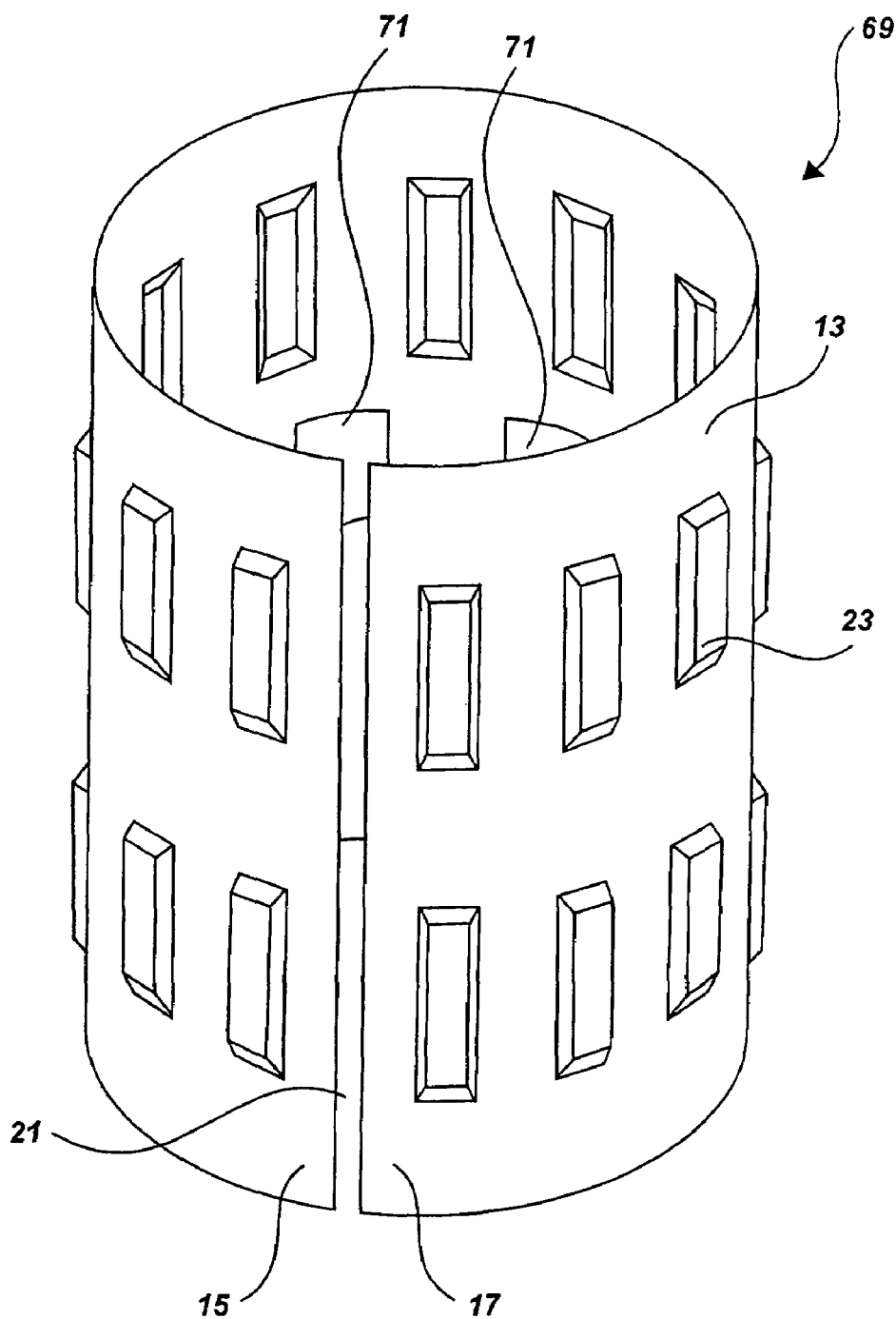
FIG. 12 is a perspective view of a tolerance ring according to yet another embodiment of the present invention.

FIG. 12 is a perspective view of a tolerance ring 69 with cut-out feature for mass eccentricity control of the base portion. The tolerance ring 69 can have contacting portions 23 arranged in two or more rows around the surface of the cylinder 13 with an aperture, generally shown as 71, along the cylinder 13. The number and size of the apertures 71 is a function of mass distribution. The function of the apertures 71 is to provide a substantially balanced and non-eccentric tolerance ring 69. It can be envisioned that the apertures 71 can have different shapes, such as, but not limited to, circle, square, triangle, polygon, or rectangle. Similarly, the apertures 71 can be distributed over one or more rows along the cylinder 13.

It is understood by a person skilled in the art that any combination of the embodiments described herein can be used without departing from the purpose of the present invention. For example, a tolerance ring can have apertures 67 or 71 in combination with a tab 49 and aperture 51. Similarly, the tolerance ring can have apertures 67 or 71 in combination with a plurality of tabs 59 and a plurality of apertures 61. The tolerance ring can have apertures 67 or 71 along with hook-shaped tabs 27 and 29. All combinations of the described embodiments can be used to reduce mass imbalance and improve mass eccentricity of an actuator arm assembly.

What is claimed is:

1. A tolerance ring, comprising:
    a cylinder having a predetermined length between two ends, with a gap along the predetermined length of the cylinder, the gap having a first and a second edge, a first tab protruding from the first edge of the gap and overlapping the second edge of the gap, the cylinder having an aperture in the surface of the cylinder.

2. The tolerance ring of claim 1, further comprising a plurality of contacting portions, each contacting portion projecting a radial distance from the cylinder.

3. The tolerance ring of claim 1, wherein the aperture extends along the length of the cylinder and reduces mass imbalance of the tolerance ring.

4. The tolerance ring of claim 3, wherein the first tab is engageable with the aperture in the surface of the cylinder.

5. The tolerance ring of claim 1, wherein the first tab has an L shaped flange to hook onto an edge of the aperture in the surface of the cylinder.

6. The tolerance ring of claim 1, wherein the first tab has a U shaped flange to hook onto an edge of the aperture in the surface of the cylinder.

7. The tolerance ring of claim 1, further comprising a second tab protruding from the second edge of the gap, and the second tab coupling to the first tab on the first edge.

8. The tolerance ring of claim 7, wherein the first tab has a hook-shaped end adapted for coupling to a hook-shaped end of the second tab.

9. A tolerance ring, comprising:
    a cylinder having a predetermined length between two ends, with a gap along the predetermined length of the cylinder, the gap having a first and a second edge; and
    a first tab protruding from the first edge of the gap and coupling to the cylinder at the second edge of the gap.

10. The tolerance ring of claim 9, further comprising a second tab protruding from the second edge of the gap, the second tab coupling to the first tab on the first edge.

11. The tolerance ring of claim 10, wherein the first tab has a hook-shaped end adapted for coupling to a hook-shaped end of the second tab.

12. The tolerance ring of claim 10, wherein the first tab is engageable with the second tab.

13. The tolerance ring of claim 9, further comprising an aperture in the surface of the cylinder for reducing mass imbalance in the cylinder.

14. The tolerance ring of claim 9, further comprising an aperture in the surface of the cylinder along the second edge for receiving the first tab.

15. The tolerance ring of claim 14, wherein the first tab has an L shaped flange to hook onto an edge of the aperture in the surface of the cylinder.

16. The tolerance ring of claim 14, wherein the first tab has a U shaped flange to hook onto an edge of the aperture in the surface of the cylinder.

* * * * *